(No Model.)
C. C. WRENSHALL.
NUT LOCK.
No. 482,910. Patented Sept. 20, 1892.
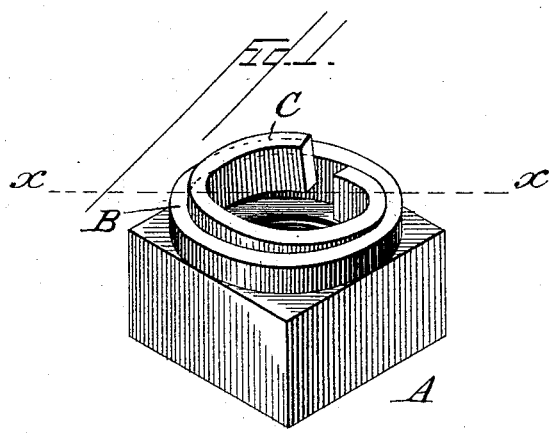
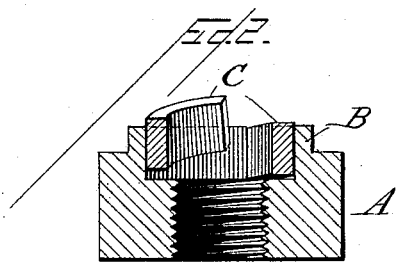
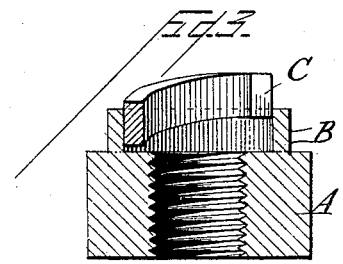
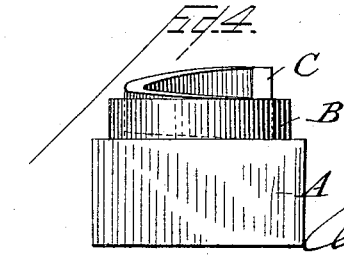
Attest:
F. H. Schott
Alfred T. Gage
Inventor
Chas. C. Wrenshall
by Paul & Meriam
Attorneys.

UNITED STATES PATENT OFFICE.

CHARLES CHRISTOPHER WRENSHALL, OF ANNISTON, ALABAMA.

NUT-LOCK.

SPECIFICATION forming part of Letters Patent No. 482,910, dated September 20, 1892.

Application filed March 14, 1892. Serial No. 424,867. (No model.)

*To all whom it may concern:*

Be it known that I, CHARLES CHRISTOPHER WRENSHALL, a citizen of the United States, residing at Anniston, in the county of Calhoun and State of Alabama, have invented certain new and useful Improvements in Nut-Locks; and I do hereby declare the following to be a full, clear, and exact description of the invention, such as will enable others skilled in the art to which it appertains to make and use the same.

My invention relates to nut-locks, and more particularly to that class or type in which a spring-washer is employed in connection with the nut to constitute the lock, and has for its object to provide a construction in which the nut and the lock, although composed of two separate pieces, will be practically one piece so far as handling of the nut and lock is concerned.

It has also for its object to prevent the block from writhing or twisting out of shape when compressed or during the "tightening-up" process.

To the accomplishment of the foregoing and such other objects as may be hereinafter set forth, or be assignable or attributable to the construction to be hereinafter described, the invention consists in providing the face of the nut—for instance, the face that will be next to the object with which the nut or a member or a portion thereof will have impact—with a recess to receive a lock, said recess being preferably formed in whole or in part by a collar or extension projecting from the face of the nut.

The invention further consists in the construction and also in the combination of parts hereinafter particularly described, and then sought to be specifically defined in the claims, reference being had to the accompanying drawings, forming a part hereof and in which—

Figure 1 is a perspective view of the nut-lock. Fig. 2 is a section on line $xx$ of Fig. 1. Fig. 3 is a vertical section illustrating the recess formed entirely in the extension on the nut. Fig. 4 is a side elevation of the form shown in Fig. 3.

In the drawings, the letter A designates a nut of any approved pattern, and is represented as formed on one face with a collar or extension B, which may be octagonal, hexagonal, or other shape exteriorly, although preferably circular or round, as illustrated, and which interiorly is represented as circular. The interior diameter of this collar or extension is such that it will receive the spring washer or lock C of such interior diameter that it may be turned freely around the bolt to which the nut will be applied and may readily pass over the threaded or the unthreaded portion of the bolt. A recess or seat is thus formed in the nut for the spring washer or lock, which is compressed when inserted in the recess, so that its expansive force will cause it to hug closely to the walls of the recess, so that the nut and the lock will be held together without other means and the two can be handled as if they were one piece, thus avoiding loss of time and trouble in the manipulation of the two and guarding against the liability of loss of the washer or lock, and also the inconvenience and annoyance resulting from dropping the washer or lock in snow, sand, or mud, and which frequently results when the nut and the lock are separate from each other. Furthermore, the washer or lock is made to fit snugly in its seat formed by the extension, so that the washer or lock is not permitted to writhe or twist out of shape when it is compressed or while the nut is being turned up tight to its place.

I prefer to form a part of the recess or seat for the washer by boring out a portion of the nut below the collar or extension, so that the seat or recess will lie partly within the collar or extension and partly within the body of the nut, as illustrated in Fig. 1 of the drawings, so as to avoid the necessity of adding materially to the thickness of the nut as a whole; but I may form the seat or recess entirely within the collar or extension by simply making the collar or extension longer or deeper, as illustrated in Fig. 3 of the drawings. The depth of the recess or seat for the spring washer or lock as compared with the diametrical thickness or section of the lock may be varied, as desired.

When the washer or lock is seated in the collar or extension, a portion of the same will extend outside of the outer face of the collar or extension, as illustrated, so that when the nut with its attached washer or lock is placed upon the bolt and screwed up to place the washer or lock will be compressed and caused to exert to a greater or less extent the pressure exerted by such form of washer or lock and otherwise act as such type of washers ordinarily act and at the same time possess the advantages which have already been specified for this particular mode of applying such type or form of washers or locks.

I have described in detail the preferred construction of the several parts forming this improved nut-lock, but by so doing I do not wish to be understood as restricting myself thereto, as the particular form of the several parts may be varied without departing from the spirit of my invention.

It is obvious to the skilled in the art that material advantages result from the general construction and arrangement of parts which I have described, and that the washer or lock will be held in place in the seat formed for it in the nut, and that the parts can be manipulated to better advantage and with freedom from the objections resulting when the parts are employed separately or otherwise than as I have described.

Having described my invention and set forth its merits, what I claim is—

1. A nut-lock comprising a nut having a collar projecting from the face of the nut back from the corners thereof and around the bolt-opening for the reception of the washer or lock, and a split spring washer or lock seated in said collar and held therein by frictional contact against the wall of the collar, a portion of the washer on one side of its split projecting outside of the collar, substantially as and for the purposes described.

2. In a nut-lock, a nut having a recess formed in the body of the nut around the bolt-opening therein and provided with a collar projecting from its face around the opening for the bolt, the inner circumference of said collar coinciding with that of said recess, whereby a seat for a washer is formed partly in the body of the nut and partly in said collar, and a spring washer or lock located in said seat and having a portion projecting outside of the collar, substantially as and for the purposes described.

In testimony whereof I affix my signature in presence of two witnesses.

CHARLES CHRISTOPHER WRENSHALL.

Witnesses:
  M. F. McCARTY,
  S. D. SAWYER.